Figure 1:
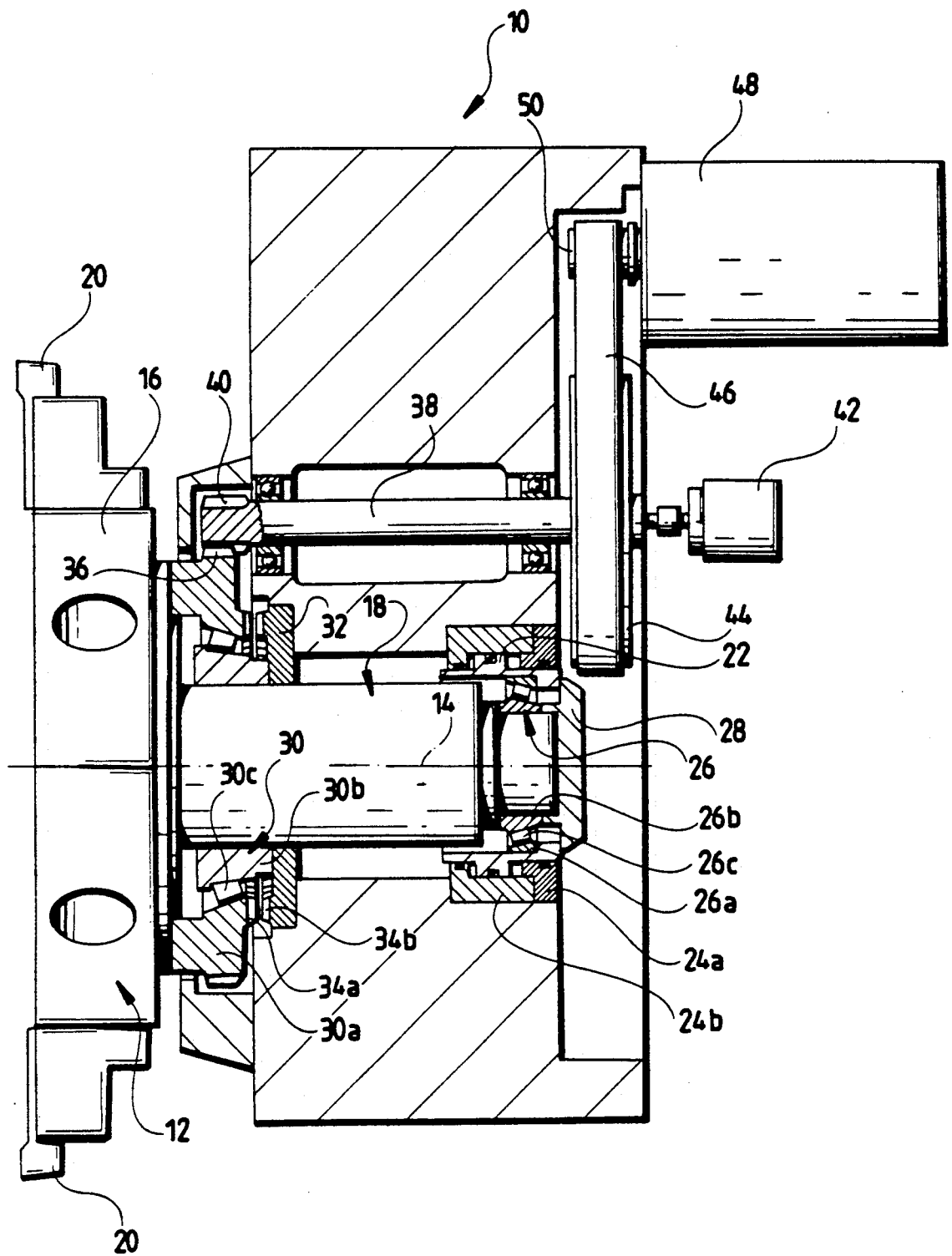

United States Patent [19]

Hafla et al.

[11] Patent Number: 5,007,314
[45] Date of Patent: Apr. 16, 1991

[54] LATHE

[75] Inventors: Dietmar F. Hafla, Hohengehren; Guenther Sommer, Esslingen, both of Fed. Rep. of Germany

[73] Assignee: Index-Werke Komm. -Ges. Hahn & Tessky, Esslingen, Fed. Rep. of Germany

[21] Appl. No.: 415,290
[22] PCT Filed: Jan. 6, 1989
[86] PCT No.: PCT/DE89/00004
§ 371 Date: Aug. 22, 1989
§ 102(e) Date: Aug. 22, 1989
[87] PCT Pub. No.: WO89/06176
PCT Pub. Date: Jul. 13, 1989

[30] Foreign Application Priority Data

Jan. 9, 1988 [DE] Fed. Rep. of Germany ....... 3800403

[51] Int. Cl.⁵ .................................................. B23B 3/00
[52] U.S. Cl. ........................................ 82/120; 82/121; 82/159
[58] Field of Search ........................... 82/120, 121, 159; 74/813 L, 826

[56] References Cited

U.S. PATENT DOCUMENTS 3,798,721  3/1974  Schalles .............................. 82/159
4,468,991  9/1984  Bleusch et al. ..................... 82/159

Primary Examiner—Frederick R. Schmidt
Assistant Examiner—Lawrence Cruz
Attorney, Agent, or Firm—Shenier & O'Connor

[57] ABSTRACT

Lathe comprising a main work spindle drivable by numerical control and a turret with several indexing stations, the turret having at least one drivable tool spindle, being mounted on a turret slide for rotation about a turret axis and being rotatable by numerical control about this axis by means of a turret driving device, and also comprising a switchable device for securing the turret against rotation. For positive locking of the turret and for play-free mounting of the unlocked turret, spur gears displaceable relative to one another in the direction of the turret axis are connected to the turret and to the turret slide in a rotationally fixed manner, and a bearing is provided for the turret which in the unlocked state of the latter is free from play.

4 Claims, 4 Drawing Sheets

LATHE

The invention relates to a lathe comprising a main work spindle drivable by numerical control and a turret with several indexing stations, the turret having at least one drivable tool spindle, being mounted on a turret slide for rotation about a turret axis, and being rotatable by numerical control about the turret axis by a turret driving device for eccentric machining, with respect to the main work spindle axis, of a workpiece held by the main work spindle by means of a driven tool of the turret, and also comprising a switchable device for securing the turret against rotation.

Such a lathe wherein a main work spindle displaceable in the direction of the so-called Y-axis (axis perpendicular to the plane of motion of the turret) is replaced by the main work spindle and the turret being slowly and synchronously rotatable by numerical control, with the axis of that tool spindle of the turret that is employed moving in a plane extending perpendicularly to the axis of the main work spindle, is known from the applicant's German patent 3 328 327. A numerically controlled electric motor carries out both the indexing of the turret to bring another of its indexing stations into the working position and the slow, numerically controlled rotation of the turret synchronously with the rotation of the main work spindle. However, this motor also has to prevent undesired rotation of the turret when a rotating workpiece held by the main work spindle is subjected to a normal turning operation with one of its non-driven tools. Since quite considerable cutting forces can occur during this operation, securing of the turret against rotation by means of the turret driving device alone is unsatisfactory. It has, therefore, been attempted to prevent such undesired rotations of the turret by means of a switchable blocking brake which does, however, have a considerable space requirement.

The object underlying the invention was, therefore, to improve the above-described known lathe such that the turrret is securable against undesired rotation by a switchable locking device of compact and sturdy design for normal turning of a workpiece held by the main work spindle with a tool of the turret, but for operations with rotating main work spindle and rotating turret, the latter is also held exactly in position in the unlocked state.

In a lathe of the kind mentioned at the beginning, this object is accomplished in accordance with the invention in that for positive locking of the turret against rotation, spur gears displaceable relative to one another in the direction of the turret axis are connected to the turret and to the turret slide in a rotationally fixed manner, and in that a bearing is provided for the turret which in the unlocked state of the latter is free from play. The device for securing against rotation comprising the spur gears may be a two-part Curvic coupling, the one spur gear of which is displaceable in the axial direction, or a three-part Curvic coupling with two concentrically arranged, ring-shaped spur gears, with one of these fixedly attached to the turret and the other to the turret slide, and opposite these a third ring-shaped spur gear which is non-rotatably but axially displaceably mounted on the turret or better on the turret slide. Since such spur gears as, for example, a Curvic coupling can be or are designed such that the meshing spur gear rims concentric with the turret axis have a centering effect with respect to the turret axis, the aforementioned turret bearing can be readily ineffective when the turret is locked.

The inventive solution has the advantages that it can be implemented in an extremely small and compact manner and that for normal turning of a workpiece, the turret is held in a rotationally fixed manner by positive connection and centrically so additional movable parts such as a blocking brake or, for example, a locking bolt movable in the radial direction, are not necessary.

The locking of a turret on the turret slide of a lathe with the aid of a two-part Curvic coupling is already known in quite conventional lathes wherein the turret is rotatable by means of a hydraulic or electric motor in steps corresponding to the spacing between two adjacent indexing stations or an integral multiple of this spacing. The turret is axially displaceably held on the turret slide and is displaced in its entirety by means of a hydraulic cylinder in the direction of the turret axis in order to lock and center it on the turret slide with the aid of the Curvic coupling and to unlock it, respectively. However, since machining is not performed on these conventional machines with the turret in the unlocked state, the preconditions prevailing here are totally different from those in the generic lathe improved by the inventive solution because in the conventional lathes with a displaceable turret there is no requirement whatever for the unlocked turret to be held without play, i.e., in the exact position on the turret slide.

An embodiment of the inventive lathe has proven particularly expedient wherein the turret bearing is designed as inclined contact bearing, in particular, as roller or ball bearings with conical races, for such a bearing is more compact than a combined radial-axial bearing and is absolutely free from play when axially tensioned in the unlocked state of the turret.

Finally, since it is easiest to press the meshing spur gears into one another by means of a pressure medium cylinder in order to use the centering effect which can be brought about by these spur gears for the turret, an embodiment is recommended wherein the turret is axially displaceable together with the one spur gear because with one and the same pressure medium cylinder, by moving the turret back and forth, the latter can then be centered by the spur gears in the one end position and the inclined contact bearing made free from play for the turret in the other end position. The construction becomes particularly simple when the one race of the inclined contact bearing is displaceable with and rigidly connected to the turret.

If during machining of a workpiece by one of the tool spindles of the turret, i.e., so long as the latter is unlocked, the turret is to be fixable in a certain rotary angular position, this is also easy to implement, in particular, with a turret which is axially displaceable by means of a pressure medium cylinder, for an advantageous embodiment of the inventive lathe is characterized in that the two spur gears fixedly connected to the turret and the turret slide, respectively, are designed such that in all rotary angular positions of the turret which do not correspond to an indexing station located in the working position, the spur gears can be pressed against each other tooth on tooth in the axial direction and thereby secured against rotation in a frictionally connected manner.

Further features, advantages and details of the invention are given in the following description and the appended drawings of two particularly advantageous embodiments of the mounting and locking of the turret in accordance with the invention.

Figure 2:
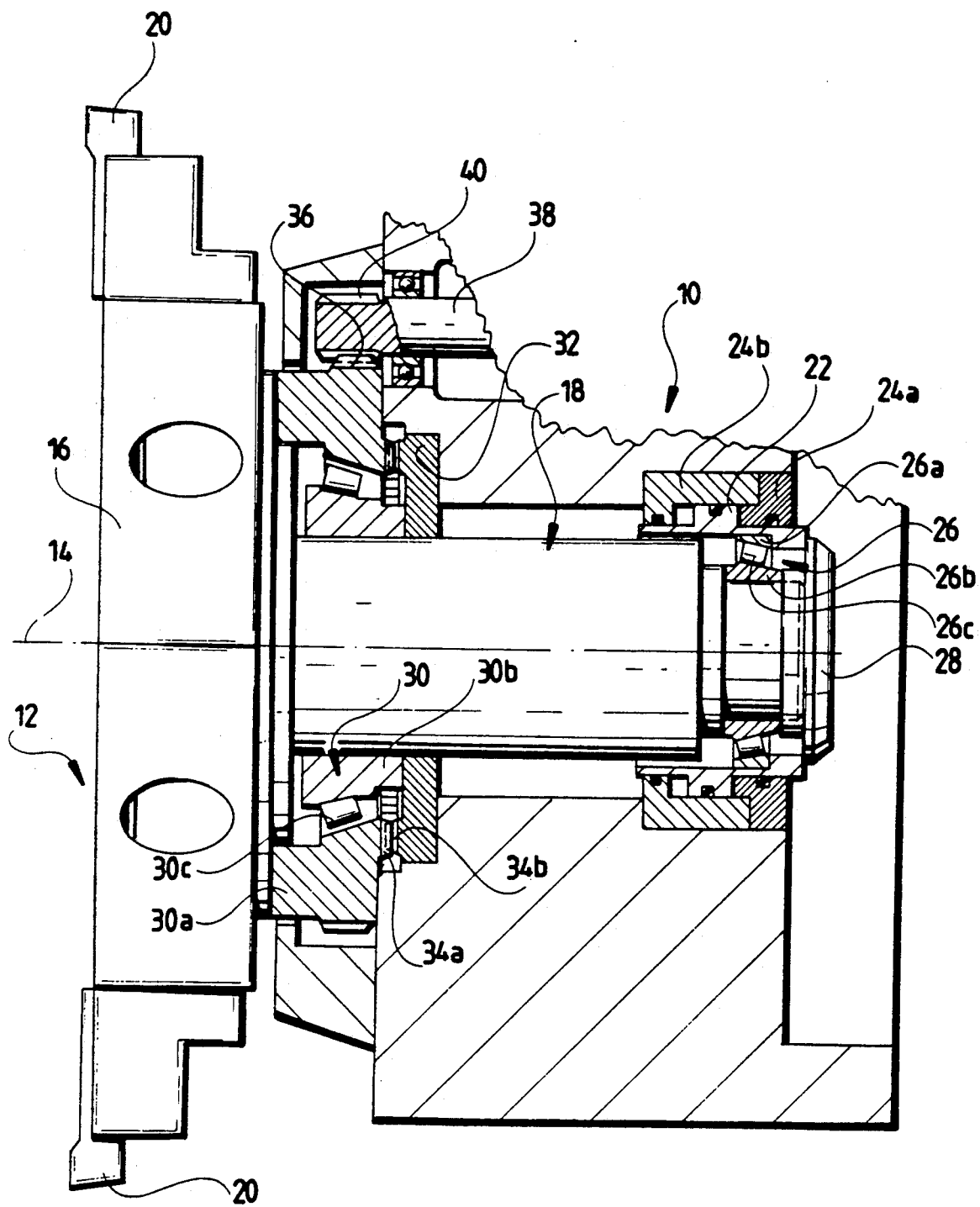
Figure 3:
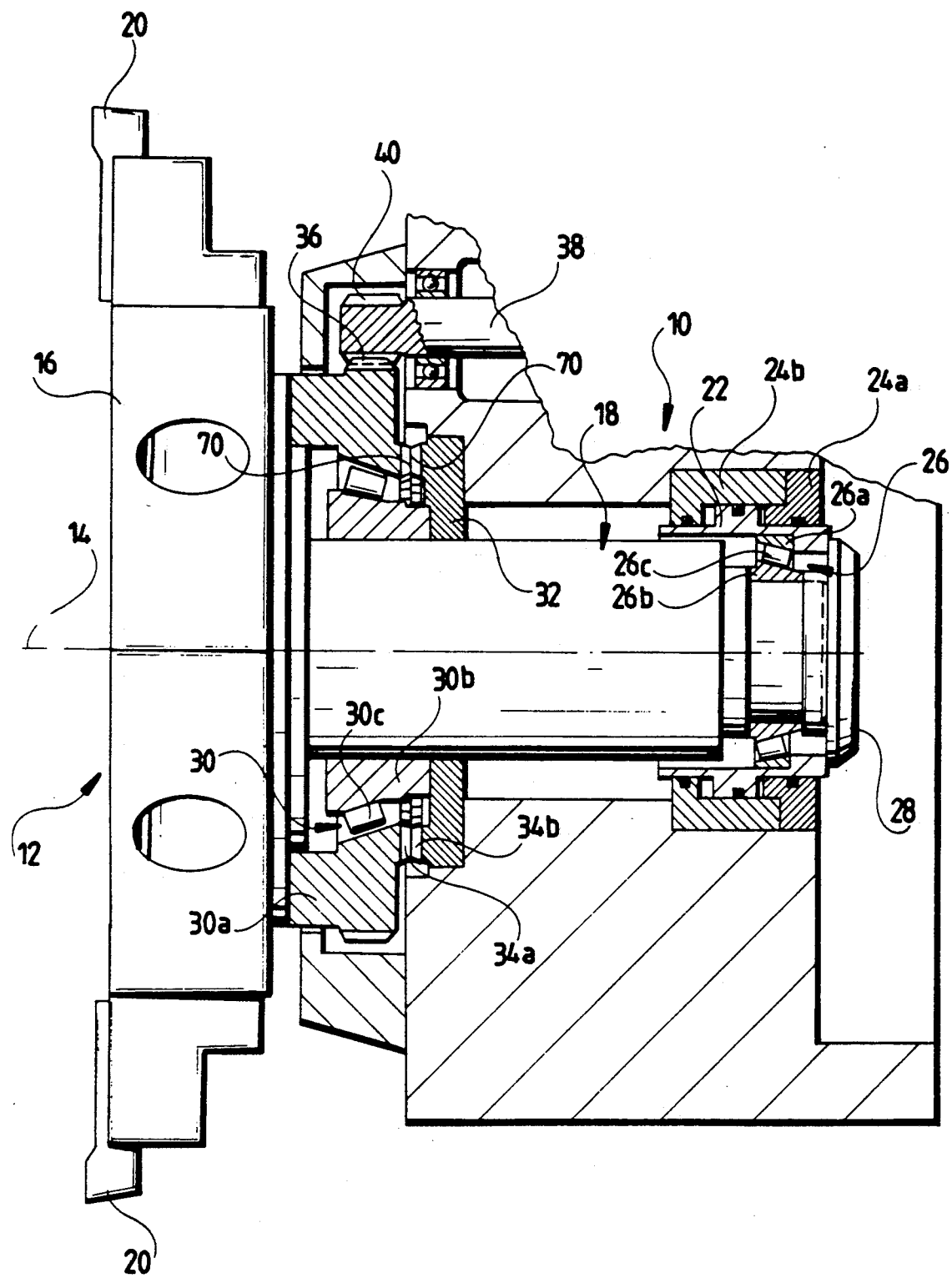
Figure 4A:
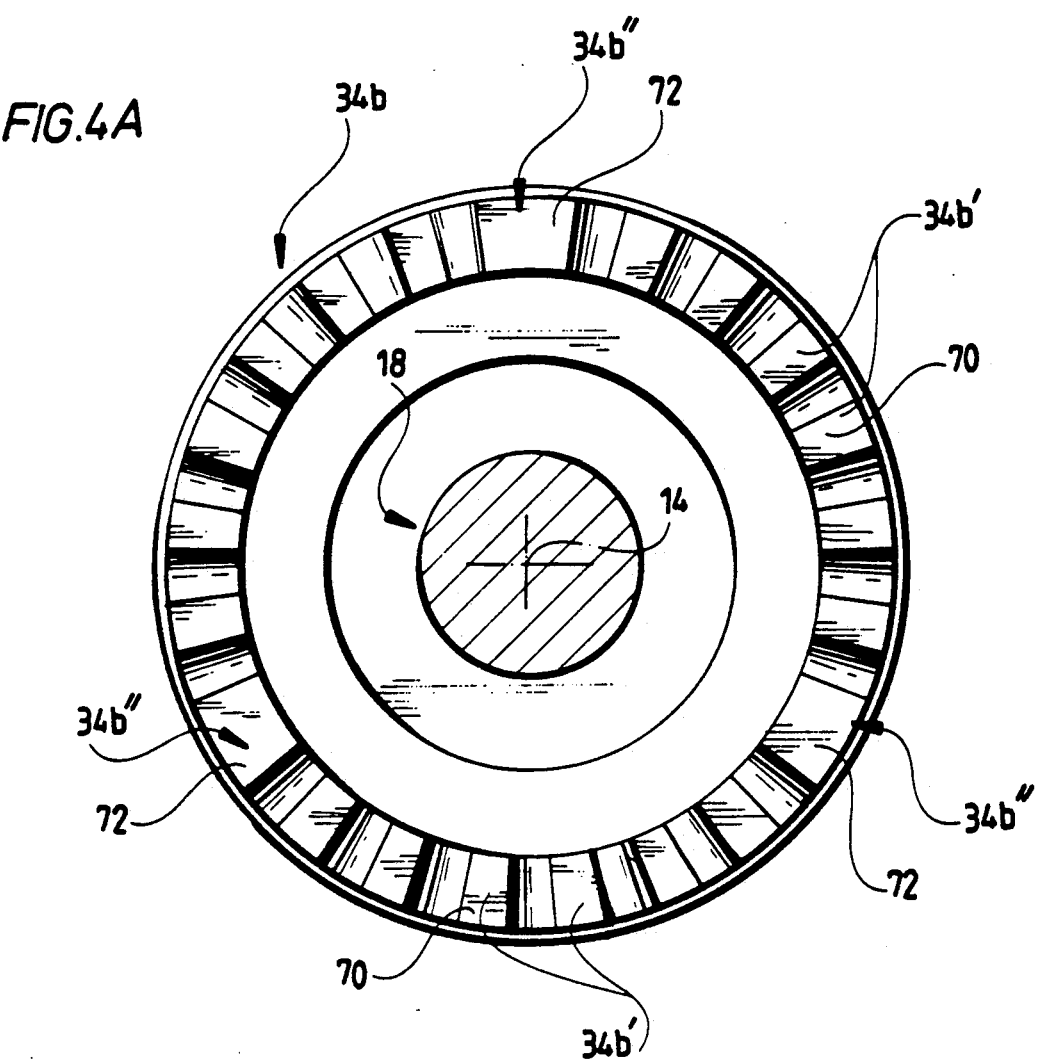
Figure 4B:
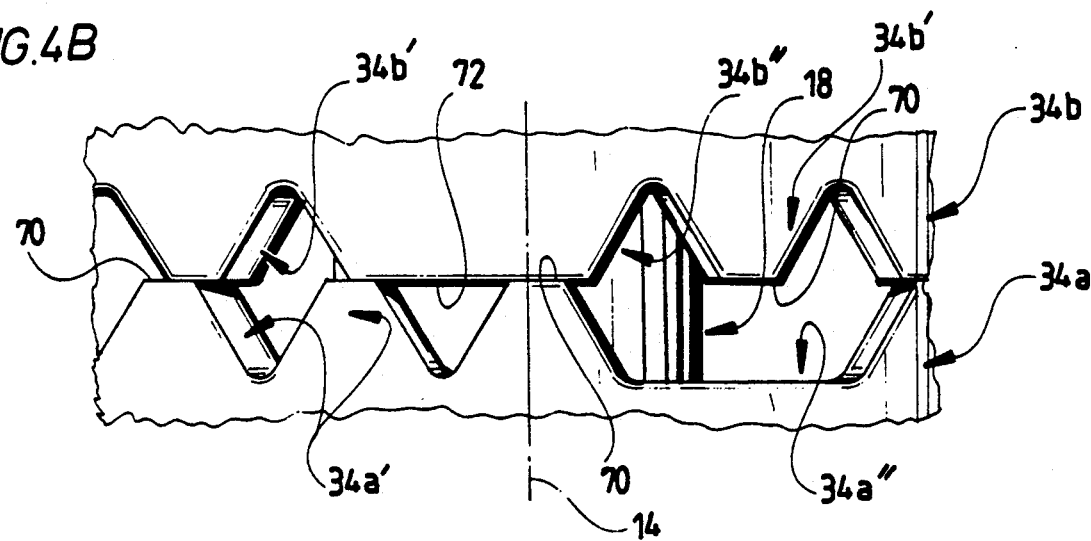

The drawings show:

FIG. 1 a schematic illustration of a turret slide and the turret mounted for rotation thereon, more specifically, with the turret in the unlocked state;

FIG. 2 a detail from FIG. 1, but with the turret in the positively locked state;

FIG. 3 the same detail as in FIG. 2, with the turret illustrated in a state in which it is unlocked, but prevented from rotating by frictional connection;

FIG. 4A: an end face view of one of the two spur gear toothings serving to lock the turret;

FIG. 4B: detail from the spur gear toothings pressed tooth on tooth against one another in the axial direction for the purpose of securing the turret against rotation by frictional connection;

FIG. 1 shows a turret slide 10 on which a turret designated in its entirety 12 is mounted for rotation about a turret axis 14. It consists of a turret head 16 and a turret shaft 18, both of hollow design, not illustrated, for accommodating drive shafts and miter gears for driving tool spindles, not shown, mounted in the turret head 16. In this connection, reference is again made to the disclosure of German Patent 3 328 327. Therefore, for reasons of simplicity, only normal external machining tools 20 carried by the turret head 16 and each defining one indexing station are illustrated.

An annular piston 22 surrounding the turret shaft 18 and guided in a hydraulic cylinder for sliding displacement in the direction of the turret axis 14 serves to move the turret 12 back and forth in the direction of the turret axis 14. This hydraulic cylinder consists of two annular cylinder parts 24a and 24b which are fixedly connected to each other and to the turret slide 10.

Attached to the annular piston 22 is an outer bearing ring 26a of a tapered roller bearing 26 whose inner bearing ring 26b is attached to the turret shaft 18. The rollers located between the two bearing rings are designated 26c. In accordance with the invention, the races formed by the two bearing rings 26a and 26b for the rollers 26c are of conical configuration. A cover 28 which is attached to the turret shaft 18 and rotates together with the inner bearing ring 26b and the turret 12 when the latter is rotated about the turret axis 14 by a turret driving device described hereinbelow, serves to protect the tapered roller bearing 26. When the annular piston 22 moves to the right in accordance with FIG. 1, the turret 12 is taken along via the cover 28, whereas when the annular piston 22 moves to the left, the turret is taken along via the tapered roller bearing 26.

In accordance with the invention, the outer bearing ring 30a of a front tapered roller bearing 30 is attached to the turret head 16. The inner bearing ring 30b of the tapered roller bearing 30 is attached to a holding ring 32 which, for its part, is fixedly connected to the turret slide 10. The rollers of the tapered roller bearing 30 are designated 30c. In accordance with the invention, the races formed by the two bearing rings 30a, 30b for the rollers 30c are of conical configuration. Accordingly, when the turret 12 is displaced, the bearing rings 30a and 30b are displaced relative to each other in the direction of the turret axis 14. For reasons of simplicity, a roller cage for the rollers 30c is not illustrated. This ensures that when the turret 12 is displaced from the position shown in FIG. 1 to the position according to FIG. 2, the rollers 30c are kept in contact with the inner bearing ring 30b.

In accordance with a further feature of the invention, in the close proximity of the front tapered roller bearing 30 and in axially spaced relation to the rear tapered roller bearing 26, an outer gear rim 34a and an inner gear rim 34b are fixedly connected to the turret 12 and the turret slide 10, respectively, more specifically, in the preferred embodiment, via the outer bearing ring 30a and the holding ring 32, respectively. In accordance with the invention, these two gear rims 34a and 34b together form a so-called Curvic coupling which when the two gear rims mesh and are pressed against each other in the axial direction, not only bring about a positive locking of the turret 12 on the turret slide 10, but also a centering of the turret with respect to the turret axis 14 defined by the inner tapered roller bearing 26. When the annular piston 22 and hence the turret 12 assumes its, in accordance with FIGS. 1 and 2, right-hand end position shown in FIG. 2, the turret is locked and centered by the Curvic coupling 34a, 34b, whereas in the left-hand end position of annular piston 22 and turret 12 shown in FIG. 1, the latter is unlocked, but the front tapered roller bearing 30 is pretensioned in the axial direction and, therefore, free from play—the rear tapered roller bearing 26 goes along with the axial movements of the turret 12 and the annular piston 22 so its state does not undergo any change by displacement of the turret.

In accordance with the invention, the outer bearing ring 30a of the front tapered roller bearing 30 is provided on its outer circumference with a driving gear rim 36 which meshes with a pinion 40 attached to a drive shaft 38, more specifically, in each position of the turret 12. The drive shaft 38 is rotatably mounted in the turret slide 10 and drives a rotary encoder 42 for numerically controlled rotation of the turret 12 and monitoring of the position of the turret. There is, furthermore, attached to the drive shaft 38 a crown gear 44 over which a toothed belt 46 runs. The toothed belt 46 is driven by an electric motor 48 via a crown gear 50 attached to the shaft of the latter. The electric motor 48 is the numerically controlled motor within the meaning of the aforegoing description. In accordance with the invention, the turret driving device, therefore, comprises only one single numerically controlled motor for both indexing and numerically controlled rotation of the turret 12. The numerically controlled motor and the rotary encoder 42 are attached to the turret slide 10.

FIG. 3 shows a state in which the turret 12 is located between the positions shown in FIGS. 1 and 2 and is secured against unintentional rotation by frictional connection. In this connection, FIGS. 4A and 4B must be explained first.

FIG. 4A is to show the inner gear rim 34b. It has a number of teeth 34b' of identical design and three teeth 34b'' of double the width, one of which is shown in a side view in FIG. 4B. The outer gear rim 34a shown partially and in a side view in FIG. 4B has a number of teeth 34a' which have the same configuration as the teeth 34b', as well as a total of twelve equidistantly arranged gaps 34a'' into which the likewise equidistantly arranged teeth 34b'' of double the width fit in twelve different rotary angular positions of the turret 12, in which case the teeth 34a' and 34b' then, of course, also mesh with one another. The turret 12 is to comprise 12 indexing stations, and by virtue of the above-described design of the gear rims 34a and 34b, the turret 12 is prevented, in accordance with the invention, from being locked in a rotary angular position which does not correspond to one of its indexing positions.

In accordance with a further feature of the invention, the teeth 34a', 34b' and the teeth 34b" of double the width are provided on their facing sides with surfaces 70 and 72, respectively, extending perpendicularly to the turret axis 14. When the turret 12 assumes a rotary angular position with respect to the turret slide 10 wherein one of its indexing stations defined by the tools carried by it is not located in the working position, with the turret in the unlocked state, the latter can with the aid of the annular piston 22 be secured against unintentional rotation in a frictionally connected manner by the gear rims 34a and 34b being pressed against one another in the axial direction, as shown in FIG. 4B. This may prove expedient when in the course of eccentric machining of a workpiece held by the main work spindle with a driven tool held by the turret, the turret is to temporarily assume a fixed rotary angular position in the unlocked state.

As will be apparent from prior U.S. Pat. No. 4,635,340 of Jan. 13, 1987 (corresponding to German patent 3 328 327), the invention is applicable to a turret which rotates about an axis parallel to the main spindle axis.

We claim:

1. A lathe comprising a main work spindle mounted for numerically controlled rotation about a main spindle axis, a tool turret having a turret body with several stations as well as a turret shaft fixedly connected to said turret body and being mounted on a turret slide for rotation about a turret axis, at least one of said turret body stations being provided with a driveable tool, said lathe also comprising turret drive means for numerically controlled rotation of said turret body and turret shaft about the turret axis, the improvement comprising:
   (a) turret shifting means for axially displacing said turret relative to said slide between a first and a second axial position;
   (b) releaseable locking means for securing said turret against rotation, said locking means comprising a first ring of teeth connected with said turret in a rotationally fixed manner and a second ring of teeth connected with said slide in a rotationally fixed manner, said first and second rings of teeth being arranged adjacent to the turret body and displaceable relative to one another in the direction of the turret axis by displacing the turret by said shifting means so that the teeth of said two rings are interengaged when the turret is in its second axial position;
   (c) a first bearing means for said turret, said first bearing means being arranged adjacent to said locking means and having two conical races, one of which being connected with the turret so that the two conical races are displaceable relative to one another in the direction of the turret axis in order to make said first bearing means free of radial play when the turret is in its first axial position; and
   (d) a second means for said turret, said second bearing means being spaced from said first bearing means in the direction of the turret axis and being axially displaceable as a unit together with the turret.

2. The lathe as claimed in claim 1, wherein the turret body is indexable into a number of index positions by said turret drive means, which number of index positions corresponds to the number of stations of said turret body, and wherein said rings of teeth are fixedly connected to said turret and to said slide, respectively, and are designed such that when the turret body is in a position between said index positions said two rings are pressable against one another tooth on tooth in the axial direction and are thereby securable against relative rotation by frictional connection.

3. The lathe as claimed in claim 1, wherein said locking means and said first bearing means are designed such that merely by axial displacement of said turret the locking means are released and said first bearing means are made free of radial play.

4. The lathe as defined in claim 1, wherein said two rings of teeth are provided by a Curvic coupling.

* * * * *

UNITED STATES PATENT AND TRADEMARK OFFICE
CERTIFICATE OF CORRECTION

PATENT NO. : 5,007,314
DATED : April 16, 1991
INVENTOR(S) : Dietmar Franz Hafla and Guenther Sommer It is certified that error appears in the above-identified patent and that said Letters Patent is hereby corrected as shown below:

Column 6, line 19 - insert -- bearing -- after "second" (first occurrence).

Signed and Sealed this

First Day of September, 1992

Attest:

DOUGLAS B. COMER

Attesting Officer

Acting Commissioner of Patents and Trademarks